United States Patent [19]

Cordle et al.

[11] Patent Number: 5,027,399
[45] Date of Patent: Jun. 25, 1991

[54] SIGNAL SWITCHING APPARATUS

[75] Inventors: Kevin G. Cordle, Rowlett; Thomas F. Martin, Richardson; James E. Austin, McKinney, all of Tex.

[73] Assignee: General Instrument Corporation, New York, N.Y.

[21] Appl. No.: 510,289

[22] Filed: Apr. 16, 1990

[51] Int. Cl.⁵ ............................................. H04N 7/167
[52] U.S. Cl. .......................................... 380/7; 380/20
[58] Field of Search ...................................... 380/7, 20

[56] References Cited

U.S. PATENT DOCUMENTS 4,039,954  8/1977  den Toonder .
4,367,557  1/1983  Stern et al. .
4,878,245  10/1989  Bradley et al. ....................... 380/7
4,937,865  6/1990  Barany ................................. 380/7

Primary Examiner—Thomas H. Tarcza
Assistant Examiner—David Cain
Attorney, Agent, or Firm—Barry R. Lipsitz

[57] ABSTRACT

Apparatus is provided for switching traps in and out of a cable television signal path. A plurality of double pole double throw switches is connected in series with the signal path. Each switch has a first actuated position, a second actuated position, and an off position. The switches connect corresponding traps to the signal path in the first actuated positions. In the second actuated positions, the switches provide a through connection in series with the signal path. An open circuit is provided along the signal path when a switch is in the off postion. Actuation and disconnect signals transmitted over the cable television network selectively actuate the switches to the frist, second, or off positions. The switches are constructed of solid-state components such as diodes, and are actuated by unipolar biasing signals.

24 Claims, 4 Drawing Sheets

TRAP OUT

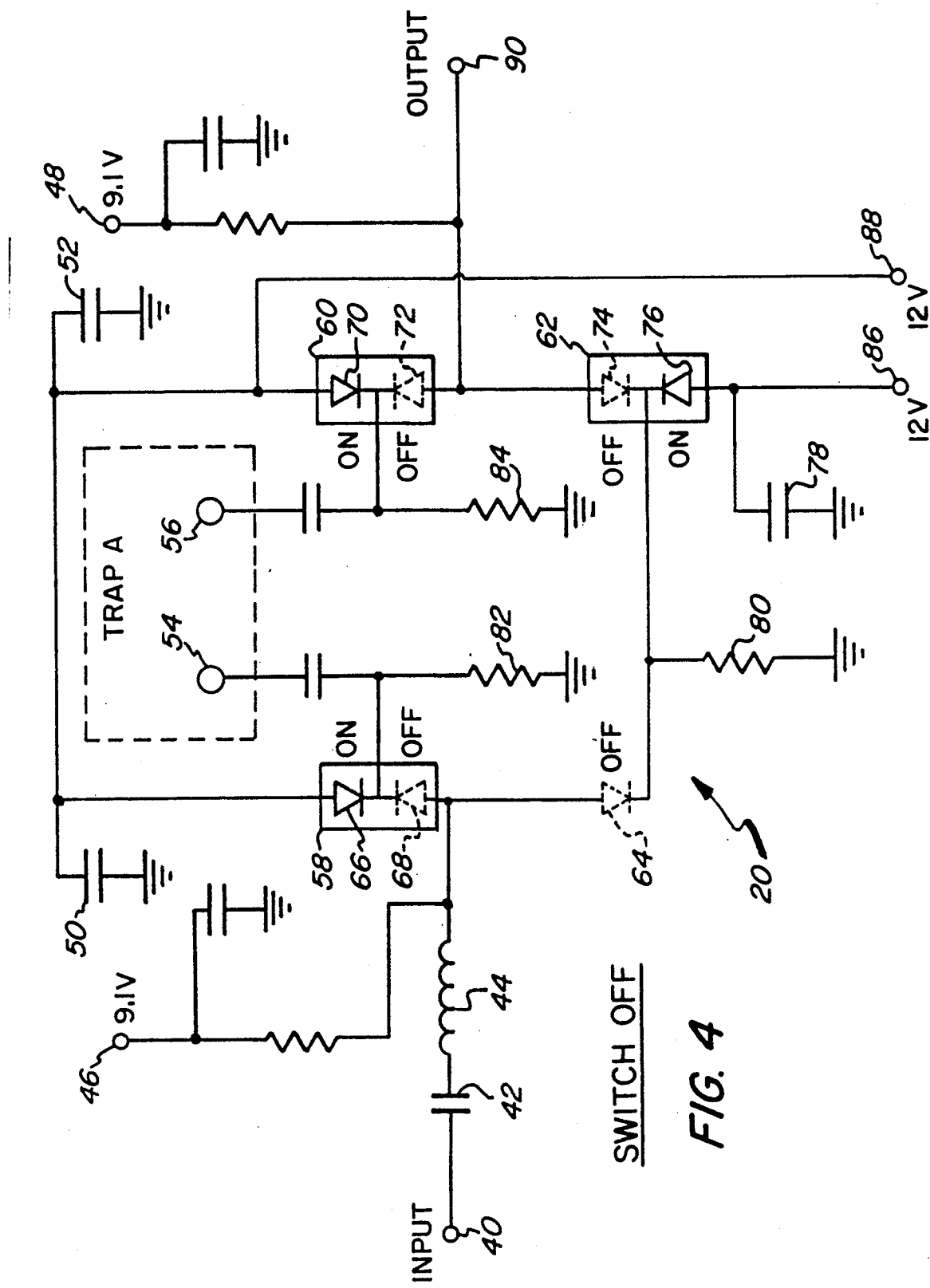
FIG. 4 SWITCH OFF

SIGNAL SWITCHING APPARATUS

BACKGROUND OF THE INVENTION

The present invention relates to signal switching apparatus, and more particularly to apparatus for selectively enabling reception of cable television signals at subscriber locations.

In cable television networks, subscribers are connected with the aid of signal distribution devices to a transmission line carrying television programs, radio programs, and associated data.

A disadvantage with most conventional cable television systems is that only subscribers who indicate that they want to receive cable television services are connected to the distribution system. Installation of new subscribers requires a technician to travel to the subscriber's residence to physically connect the cable. Upon a termination of service, a technician has to travel again to the residence to disconnect the subscriber from the distribution network.

Certain programs transmitted over the cable television network are premium programs that the subscriber must pay an additional fee to receive. In the past, subscribers have been authorized to receive such programs in various ways. In some systems, a technician must travel to the subscriber's residence to install or remove traps (i.e., signal filters) or descramblers in the subscriber drop. In other systems, addressable converter/-descramblers are provided to the subscribers. A cable system operator then authorizes or deauthorizes the receipt of programs by transmitting control signals to each subscriber's addressable converter. Although this technique has been very successful, it is somewhat expensive due to the converter hardware requirements.

It would be advantageous to provide a relatively inexpensive signal distribution device that could be remotely controlled from a cable television headend to enable or disable the reception of particular cable television channels by individual subscribers. It would be further advantageous to provide such a distribution device that can be economically installed at each residence in a neighborhood during the original installation of a cable television network, regardless of whether or not those living at the residence intend to become cable subscribers. It would be further advantageous for such a device to enable the selective coupling and decoupling of a plurality of signal traps in series with a subscriber drop to enable and disable the reception of designated program channels. Such a device should permit the cable system operator to switch the traps in and out of the subscriber drop without allowing subscribers or others to switch the traps themselves.

It would be further advantageous to provide the distribution device with an off position wherein cable television signals carried on the transmission line are blocked from entering residences of those who are not subscribers. Such an off position would also enable the remote disconnection of terminated subscribers.

The present invention provides such a distribution device.

SUMMARY OF THE INVENTION

In accordance with the present invention, apparatus is provided for switching traps in and out of a signal path. A plurality of double pole double throw switches is coupled in series with a signal path. Each switch has a first actuated position, a second actuated position, and an off position. Each switch is coupled to connect a corresponding trap to the signal path in the first actuated position. The switches provide a through connection in series with the signal path in their second actuated position. An open circuit is provided along the signal path when a switch is in the off position. Means are provided for selectively actuating the switches to the first and second actuated positions in response to actuation signals received by the switches. Means are provided for turning at least one of the switches to the off position in response to a disconnect signal received by the switch. In order to provide maximum attenuation in the signal path, means can be provided for turning all of the switches to the off position in response to a disconnect signal.

The signal path may be coupled to receive signals from a cable television transmission line. In this instance, the actuation and disconnect signals are derived from digital commands received over the cable television network. The traps connected to the signal path in the first actuated positions of the switches can comprise fixed frequency filters for allowing or denying reception of cable television channels.

A two pole electrically actuable RF switch is also provided. A first RF signal path comprises a plurality of diodes. A second RF signal path also comprises a plurality of diodes. Means are provided for biasing the diodes with signals of one polarity to pass RF signals on the first signal path and simultaneously block the second signal path. Means are provided for alternately biasing the diodes with signals of said one polarity to pass RF signals on the second signal path and simultaneously block the first signal path. Means are further provided for alternately biasing the diodes with signals of said one polarity to simultaneously block the first and second signal paths. A trap may be coupled to the first signal path for allowing or denying the reception of specific signals.

In a preferred embodiment, the first signal path in the RF switch comprises a first pair of diodes coupled at a common electrode and a second pair of diodes coupled at a common electrode. In both instances, the common electrode may comprise a cathode. The second signal path comprises a third pair of diodes coupled at a common electrode (e.g., cathode) and an additional diode. The RF switch further comprises means for coupling the additional diode in series with the second signal path, means for coupling one diode in each pair in series with its associated signal path, and means for coupling the other diode in each pair to provide an RF shunt. The anodes of the shunt diodes of the first and second pair are coupled to a DC bias signal of a first magnitude. The anode of the shunt diode of the third pair is coupled to a DC bias signal of a second magnitude. The anodes of the series diodes are coupled to a DC bias signal of a third magnitude between the first and second magnitudes when the first and second magnitudes are not equal, and below the first and second magnitudes when they are equal. The cathodes of the diodes are coupled to ground through biasing resistors and the anodes of the shunt diodes are A.C. coupled to ground through capacitors.

The apparatus of the present invention is useful to selectively enable reception at a subscriber location of signals transmitted over a cable television network. One or more of the electrically actuable RF switches may be coupled in series with a subscriber drop, with each switch controlling a subscriber's access to a different television channel.

BRIEF DESCRIPTION OF THE DRAWINGS

FIG. 4 is a schematic diagram of the RF switch in the off position.

DETAILED DESCRIPTION OF THE INVENTION

Figure 1:
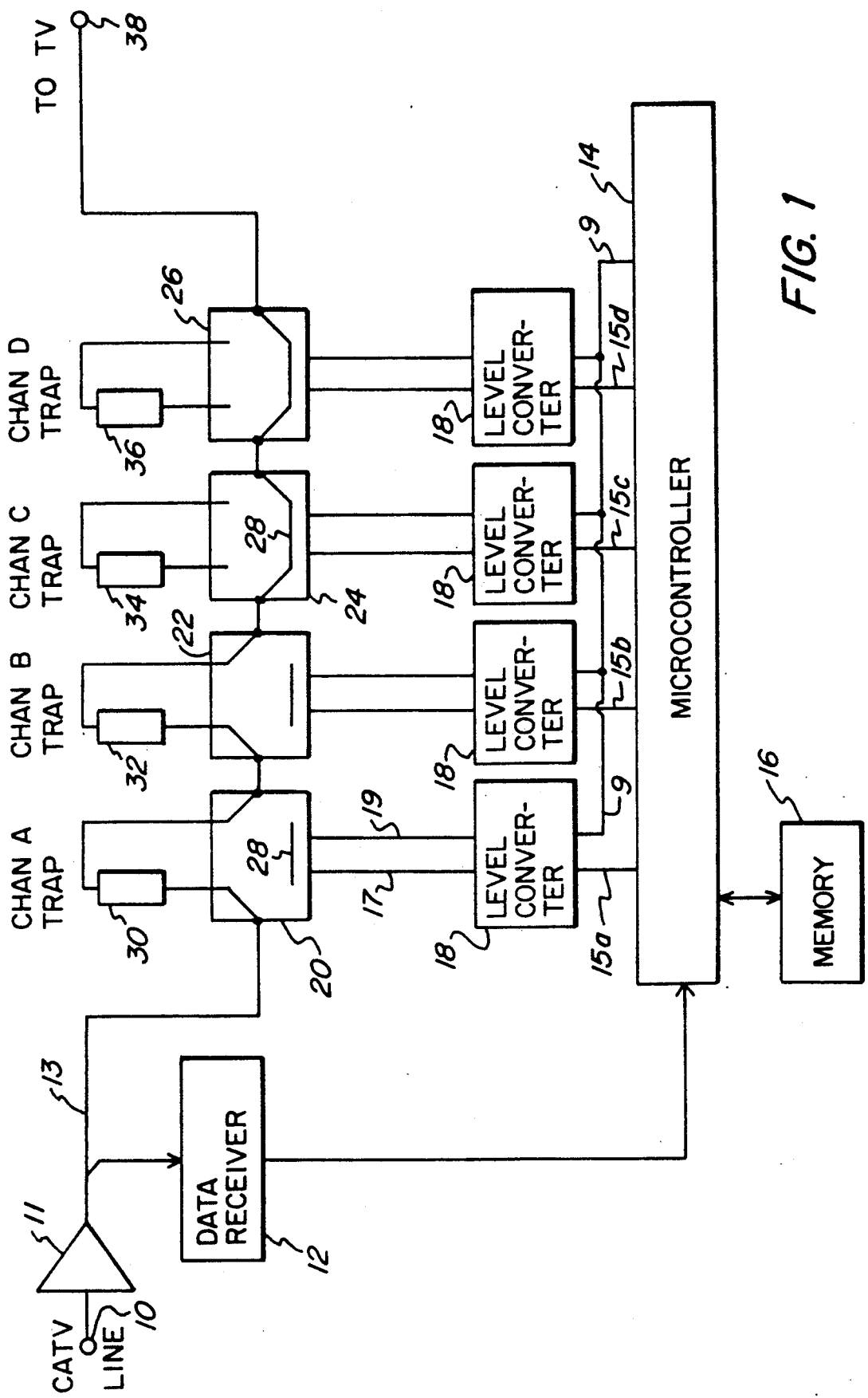
FIG. 1 is a block diagram of a cable television distribution device in accordance with the present invention.

As illustrated in FIG. 1, a device is provided for switching traps in or out of a circuit, such as a cable television subscriber drop. In a cable television application, the traps may be either "positive" or "negative". A positive trap is a filter that removes an interfering carrier to authorize a cable television service. A negative trap is a filter used to remove a nonauthorized service. Control signals for the device are sent on an out-of-band data carrier from a cable television headend to the subscriber residence. The transmission of such control signals is well known in the art. In current systems using addressable converter/descramblers, the control signals are typically sent as FM data, for example FSK modulated data. Where signals pertain only to a particular television program, they may be sent as AM tag data in the sound carrier of the television program signal. Apparatus for transmitting and receiving data signals over a cable television system is described, for example, in commonly assigned U.S. Pat. No. 4,710,955 to Kauffman, entitled "Cable Television System With Two-Way Telephone Communication Path".

In the apparatus illustrated in FIG. 1, signals transmitted on a cable television transmission line are received at terminal 10 and input to a conventional RF amplifier 11. The amplified signal is received by data receiver 12 which is an FM receiver for detecting digital data carried on the cable television network. Both individually addressed and global messages may be sent as data over the cable television network. These messages are coupled from data receiver 12 to a microcontroller 14 where they are decoded and acted upon to control the state of a plurality of RF switches 20, 22, 24, 26. Microcontroller 14 will decode and act on all global messages it receives. When individually addressed messages are received, microcontroller 14 will only respond to those specifically addressed to it. A nonvolatile memory 16 is coupled to microcontroller 14 and stores an address for the particular subscriber unit together with an authorization bit map indicative of the cable channels the subscriber is authorized to receive. RF switches 20, 22, 24, 26 will be actuated in accordance with the authorization data to permit reception of authorized services and deny reception of nonauthorized services.

Each RF switch operates in a double pole double throw (DPDT) configuration, with the appropriate trap connected in one leg of the switch. One path of each switch is routed to pass the received cable signals to and from the trap. When positive traps are used, this path will be selected when a channel to which the trap corresponds is authorized for reception. When negative traps are used, this path is selected when a channel to which the trap corresponds is not authorized for reception. Traps 30, 32, 34 and 36 are illustrated for use with RF switches 20, 22, 24, 26, respectively.

The other path in each switch is a through connection, illustrated by reference numeral 28. The through connection 28 is selected for positive trap configurations when a signal is not authorized for reception. Through connection 28 is used for negative trap configurations to provide access to an authorized channel.

In the example shown in FIG. 1, traps 30 and 32 for channel A and channel B, respectively, are coupled in series with the cable television signal path 13. Traps 34 and 36 for channel C and D, respectively, are not coupled to the cable television signal path. Instead, switches 24 and 26 are shown in their through connection mode. Thus, where the traps illustrated in FIG. 1 are all positive traps, channels A and B will be available for viewing on a television coupled to terminal 38, and channels C and D will not be available.

Control signals for actuating switches 20, 22, 24, 26 are provided by microcontroller 14 via level converters 18. Each level converter 18 receives digital data on a respective control line 15a-15d from microcontroller 14 indicating whether the associated switch should be set to a first actuated position connecting the corresponding trap to the signal path or to a second actuated position providing through connection 28 in series with the signal path. Digital data output from microcontroller 14 on a common disconnect line 9 is used to set the switches to an off position providing an open circuit along the signal path. In the off position, neither of the poles of the DPDT switch are coupled to the corresponding trap or through connection.

Level converters 18 output single polarity DC signals on lines 17 and 19. For example, switch 20 can be switched to its first actuated position by providing a +12V signal on line 17 and a 0V signal on line 19. The second actuated position can be obtained by placing a 0V signal on line 17 and a 12V signal on line 19. The off position is obtained by placing a +12V signal on both of lines 17 and 19, as described below. Level converters 18 can each comprise, for example, a pair of operational amplifiers that are configured to produce the 0V and +12V signals depending on the state of digital signals applied to the inputs thereof. Those skilled in the art will appreciate that many other circuits can alternately be used for level converters 18. Further, it is noted that the 0V and +12V signals described above are examples only, and other signal values can be used instead.

Figure 2:
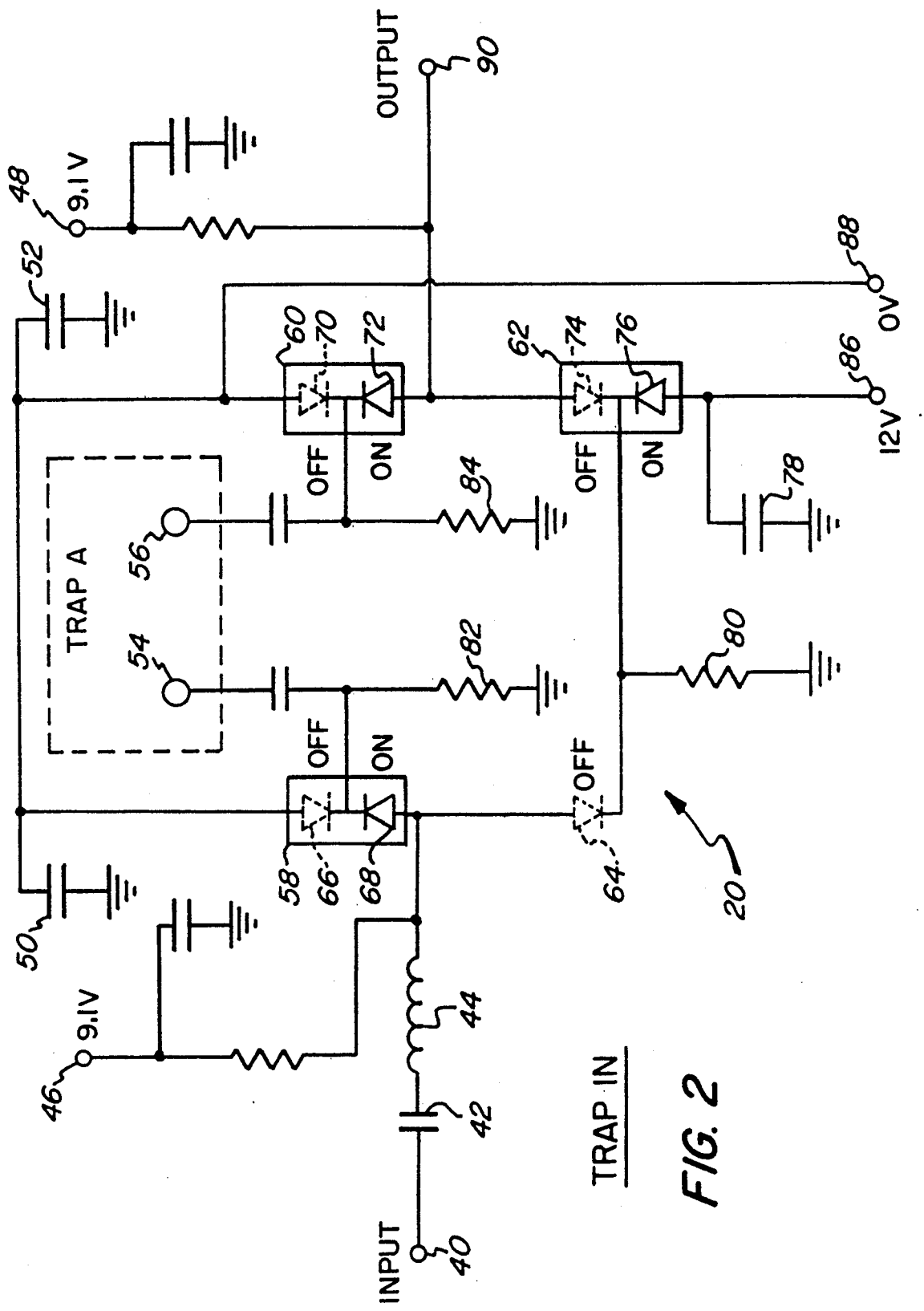
FIG. 2 is a schematic diagram of an RF switch in accordance with the present invention illustrating the condition when a trap is switched into a signal path.

FIG. 2 is a schematic diagram illustrating the operation of RF switch 20 when the channel A trap is coupled to the signal path. The incoming signals are coupled to switch 20 at input terminal 40. The signals are filtered at capacitor 42 and choke 44 and applied to a plurality of diodes. A first pair of diodes 58 and second diode pair 60 form a first RF signal path in series with terminals 54, 56 to which a series trap can be coupled. In a preferred embodiment, the series trap is a fixed frequency filter for allowing or denying reception of cable television channels. Such traps are well known in the art, and are typically fabricated from various capacitive, resistive, and inductive elements.

Diode pair 58 comprises back-to-back diodes 66, 68 coupled at their cathodes. Similarly, diode pair 60 comprises back-to-back diodes 70, 72 coupled at their cathodes. The common cathodes of diode pair 58 are coupled through biasing resistor 82 to ground. The common cathodes of diode pair 60 are coupled to ground through biasing resistor 84. Diodes 68 and 72 are coupled as series diodes in the first signal path. Diodes 66 and 70 are coupled as shunt diodes in the first signal path. Shunt diodes 66, 70 are A.C. coupled to ground through shunt capacitors 50, 52, respectively.

A second signal path is formed by diode pair 62 and an additional diode 64. Diode pair 62 comprises back-to-back diodes 74, 76 sharing common cathodes. The cathodes of all of the diodes in the second signal path are coupled to ground through biasing resistor 80. Diode 74 of diode pair 62 is connected as a series diode within the second signal path. Diode 76 is A.C. coupled to ground through capacitor 78 to provide an RF shunt.

The various diodes in the circuit of FIG. 2 are biased by a combination of three DC bias signals having the same polarity and different magnitudes. When it is intended to have a signal input at terminal 40 pass through the trap, diodes 64, 66, 70 and 74 are biased so that they are off, as indicated by dashed lines in the figure. Diodes 68, 72 and 76 are biased so that they are turned on. This is accomplished by providing a positive DC voltage (e.g., +12V) at terminal 86 and a lower DC voltage of the same polarity (e.g., 0V) at terminal 88. The 12V bias voltage is applied to the anode of diode 76. The 0V bias voltage is applied to the cathodes of diodes 66 and 70. A third bias voltage having a magnitude between the voltages applied at terminals 86, 88 (e.g., 9.1V) is applied to the anode of diode 68 via terminal 46 and to the anode of diode 72 via terminal 48. With this combination of applied bias voltages, an RF signal input at terminal 40 will pass through diode 68 to terminal 54, proceed through a trap coupled between terminals 54 and 56, and on through diode 72 to output terminal 90. Propagation of the RF signal through the second signal path is blocked by diodes 64 and 74, which are turned off.

Figure 3:
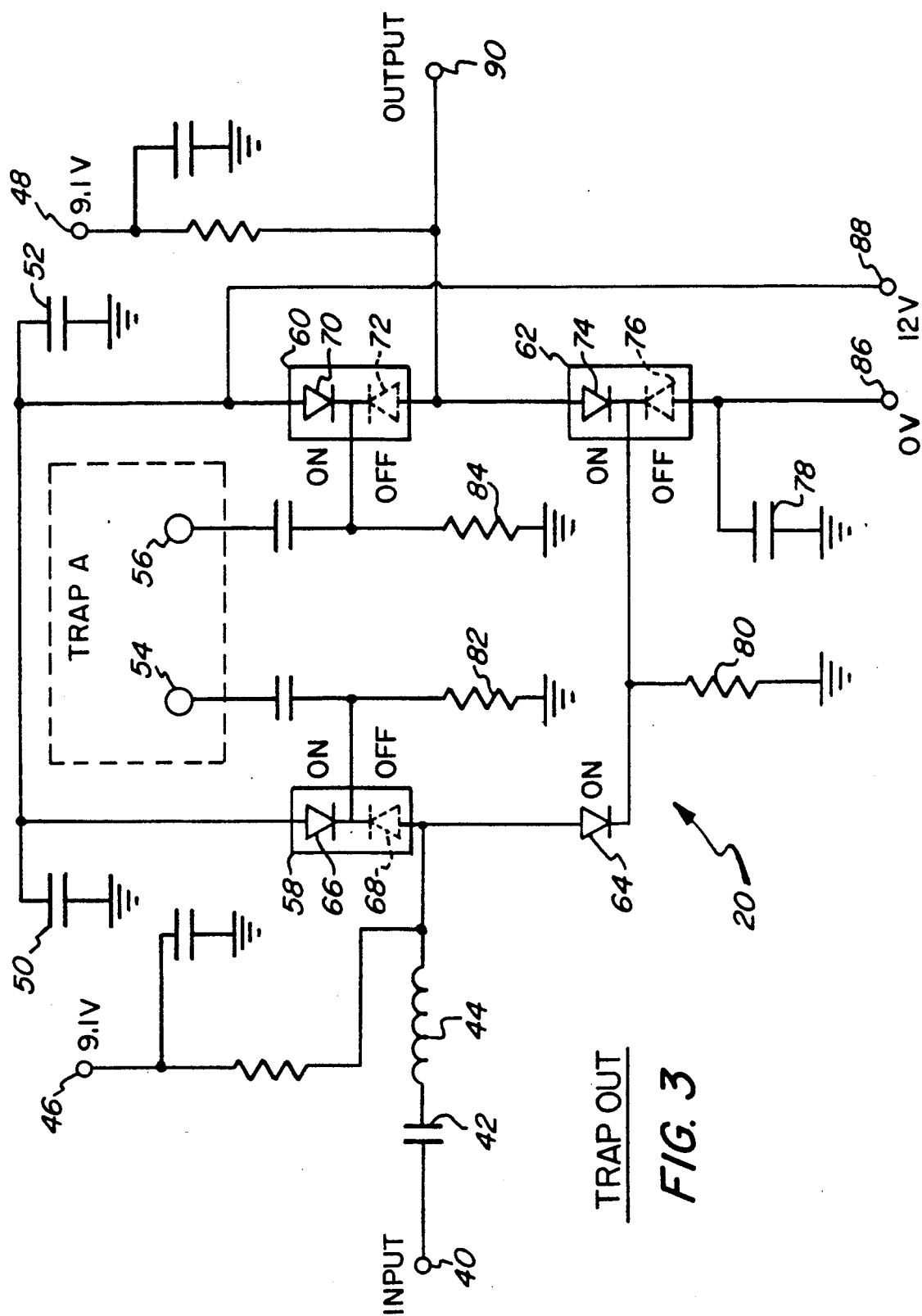
FIG. 3 is a schematic diagram of the RF switch illustrating the condition when a trap is switched out of the signal path.

FIG. 3 illustrates RF switch 20 when the diodes are biased to block the first signal path and pass RF signals on the second signal path. In particular, a 0V signal is input at terminal 86, a +12V signal is input at terminal 88, and the +9.1V bias signal applied to the anodes of diodes 68 and 72 remain the same as in FIG. 2. In this configuration, diodes 68 and 72 will be turned off in the first signal path, precluding the RF signal from passing through the trap. Diodes 64 and 74 are turned on since they are forward biased by the +9.1V voltage applied to their anodes. Accordingly, an RF signal input at terminal 40 will pass through diodes 64 and 74 to output terminal 90. Since no trap is coupled in the second signal path, a through connection is provided by diodes 64 and 74 to the output terminal.

FIG. 4 illustrates RF switch 20 when biased to turn both the first and second signal paths off, thereby providing an open circuit between input terminal 40 and output terminal 90. Identical +12V signals are applied at both terminals 86 and 88. The +9.1V bias signals applied at terminals 46 and 48 remain the same as in FIGS. 2 and 3. As can be seen, shunt diodes 66, 70, and 76 are biased on, and series diodes 64, 68, 72, and 74 are biased off. Since all the series diodes are off, an RF signal applied at input terminal 40 is blocked in both the first and second signal paths, and does not reach output terminal 90. The off position of the RF switch as illustrated in FIG. 4 facilitates the blocking of all services on a cable television subscriber drop coupled to the output of the switch. As a result, there is no need to provide a separate switch to disconnect a subscriber's service. Further, when a plurality of RF switches are coupled in series with the subscriber drop as illustrated in FIG. 1, turning all of the switches off provides greater signal attenuation than would be provided by one separate disconnect switch.

It will now be appreciated that the present invention provides apparatus for switching traps in and out of a signal path using electrically actuated double pole double throw switches. The switches may be fabricated from a plurality of solid-state diodes. Providing different combinations of unipolar bias voltages to the diodes enables the switches to be placed in a first actuated position, a second actuated position, or an off position. Commands for effecting switch actuation can be transmitted over a cable television transmission line that feeds a subscriber drop containing a plurality of the switches in series.

Although the present invention has been described in connection with a specific embodiment thereof, it will be appreciated by those skilled in the art that numerous adaptations and modifications may be made thereto without departing from the spirit and scope of the invention as set forth in the claims.

What is claimed is:

1. Apparatus for switching traps in and out of a signal path comprising:
  a plurality of double pole double throw switches in series with a signal path, each switch having a first actuated position, a second actuated position, and an off position;
  means for coupling each switch to connect a corresponding trap to said signal path in said first actuated position;
  means for coupling each switch to provide a through connection in series with said signal path in said second actuated position;
  means for coupling each switch to provide an open circuit along said signal path in said off position;
  means for selectively actuating said switches to the first and second actuated positions in response to actuation signals received by said switches; and
  means for turning at least one of said switches to the off position in response to a disconnect signal received by said switch.

2. Apparatus according to claim 1 wherein all of said switches are turned to the off position in response to said disconnect signal.

3. Apparatus according to claim 1 further comprising:
  means for coupling said signal path to receive signals from a cable television transmission line.

4. Apparatus according to claim 3 wherein said actuation and disconnect signals are derived from commands received from the cable television transmission line.

5. Apparatus according to claim 3 wherein said traps comprise fixed frequency filters for allowing or denying reception of cable television channels.

6. A two pole electrically actuable RF switch comprising:
  a first RF signal path comprising a plurality of diodes;
  a second RF signal path comprising a plurality of diodes;
  means for biasing said diodes with signals of one polarity to pass RF signals on said first signal path and simultaneously block said second signal path; and
  means for alternately biasing said diodes with signals of said one polarity to pass RF signals on said second signal path and simultaneously block said first signal path.

7. A switch according to claim 6 further comprising:
a trap coupled to said first signal path.

8. A switch according to claim 6 further comprising:
means for alternately biasing said diodes with signals of said one polarity to simultaneously block said first and second signal paths.

9. A switch according to claim 8 wherein:
said first signal path comprises a first pair of diodes coupled at a common electrode and a second pair of diodes coupled at a common electrode;
said second signal path comprises a third pair of diodes coupled at a common electrode and an additional diode; said switch further comprising:
means for coupling the additional diode in series with said second signal path;
means for coupling one diode in each pair in series with its associated signal path; and
means for coupling the other diode in each pair to provide an RF shunt.

10. A switch according to claim 9 wherein said common electrodes are cathodes.

11. A switch according to claim 10 further comprising:
means for coupling the anodes of the shunt diodes of said first and second pair to a DC bias signal of a first magnitude;
means for coupling the anode of the shunt diode of said third pair to a DC bias signal of a second magnitude; and
means for coupling the anodes of the series diodes to a DC bias signal of a third magnitude between said first and second magnitudes when the first and second magnitudes are not equal, and below said first and second magnitudes when they are equal.

12. A switch according to claim 11 wherein the cathodes of said diodes are coupled to ground through biasing resistors.

13. A switch according to claim 12 wherein the anodes of said shunt diodes are coupled to ground through capacitors.

14. Apparatus for selectively enabling reception at a subscriber location of signals transmitted over a cable television network comprising:
an electrically actuable RF switch having a first actuated position, a second actuated position, and an off position;
means for coupling said switch to a cable television transmission line to pass cable television signals in said first and second actuated positions and to block said signals in said off position; and
means for coupling a trap to said switch to selectively filter the signals passed in said first actuated position.

15. Apparatus in accordance with claim 14 wherein said switch comprises:
a first signal path including a plurality of diodes for passing cable television signals in said first actuated position;
a second signal path including a plurality of diodes for passing cable television signals in said second actuated position;
means for biasing said diodes with signals of one polarity to pass RF signals on said first signal path and simultaneously block said second signal path;
means for alternately biasing said diodes with signals of said one polarity to pass RF signals on said second signal path and simultaneously block said first signal path; and
means for alternately biasing said diodes with signals of said one polarity to simultaneously block said first and second signal paths.

16. Apparatus according to claim 15 wherein:
said first signal path comprises a first pair of diodes coupled at a common electrode and a second pair of diodes coupled at a common electrode;
said second signal path comprises a third pair of diodes coupled at a common electrode and an additional diode; said switch further comprising:
means for coupling the additional diode in series with said second signal path;
means for coupling one diode in each pair in series with its associated signal path; and
means for coupling the other diode in each pair to provide an RF shunt.

17. Apparatus according to claim 16 wherein said common electrodes are cathodes.

18. Apparatus according to claim 17 comprising:
means for coupling the anodes of the shunt diodes of said first and second pair to a DC bias signal of a first magnitude;
means for coupling the anode of the shunt diode of said third pair to a DC bias signal of a second magnitude; and
means for coupling the anodes of the series diodes to a DC bias signal of a third magnitude between said first and second magnitudes when the first and second magnitudes are not equal, and below said first and second magnitudes when they are equal.

19. Apparatus according to claim 18 wherein the cathodes of said diodes are coupled to ground through biasing resistors.

20. Apparatus according to claim 19 wherein the anodes of said shunt diodes are coupled to ground through capacitors.

21. Apparatus according to claim 15 further comprising:
means for coupling said first and second signal paths to a cable television subscriber drop.

22. Apparatus according to claim 15 wherein said biasing means derives the unipolar biasing signals from commands received from said cable television transmission line.

23. Apparatus according to claim 14 comprising:
a plurality of electrically actuable RF switches each having a first actuated position, a second actuated position, and an off position; and
means for coupling said switches in series to pass cable television signals in said first and second actuated positions and to block said signals in said off position.

24. Apparatus according to claim 23 wherein each switch comprises:
a first signal path including a plurality of diodes for passing cable television signals in said first actuated position;
a second signal path including a plurality of diodes for passing cable television signals in said second actuated position;
means for biasing said diodes with signals of one polarity to pass RF signals on said first signal path and simultaneously block said second signal path;
means for alternately biasing said diodes with signals of said one polarity to pass RF signals on said second signal path and simultaneously block said first signal path; and
means for alternately biasing said diodes with signals of said one polarity to simultaneously block said first and second signal paths.

* * * * *